June 24, 1969     H. G. SELL     3,452,231
REFRACTORY OXIDE INCANDESCENT LAMP
Filed March 14, 1966
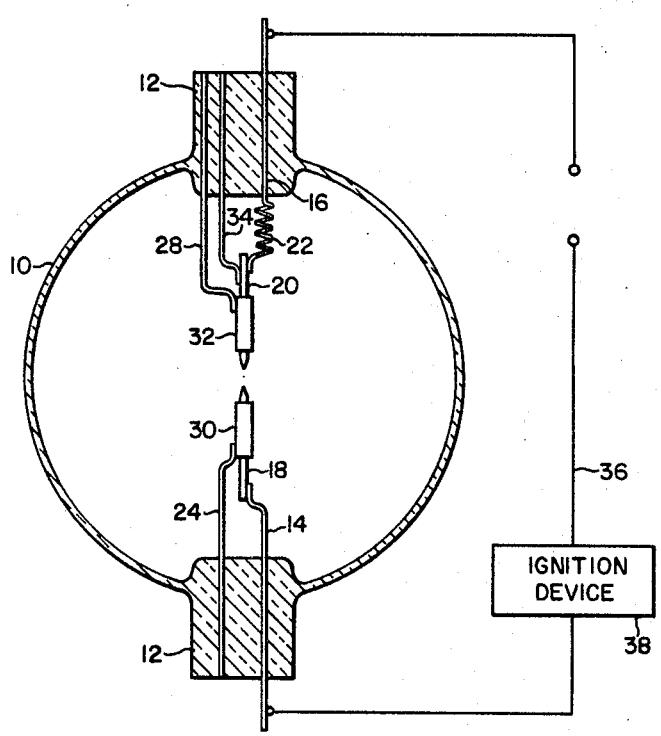
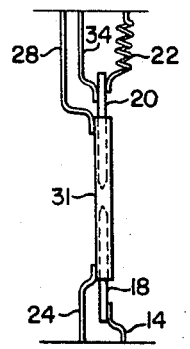
WITNESSES
INVENTOR
Heinz G. Sell
BY
ATTORNEY

United States Patent Office 3,452,231
Patented June 24, 1969

---

3,452,231
REFRACTORY OXIDE INCANDESCENT LAMP
Heinz G. Sell, Cedar Grove, N.J., assignor to Westinghouse Electric Corporation, Pittsburgh, Pa., a corporation of Pennsylvania
Filed Mar. 14, 1966, Ser. No. 534,238
Int. Cl. H01j 61/96
U.S. Cl. 313—8
4 Claims

ABSTRACT OF THE DISCLOSURE

A light source which includes, within a sealed envelope, a pair of spaced apart discharge sustaining electrodes which are surrounded by at least one ceramic (refractory oxide) cylinder and disposed in an inert gas atmosphere at less than atmospheric pressure. When an arc is established between the electrodes the ceramic cylinder is heated by the electrodes to a temperature at which it becomes a good light radiator and emits selectively in the visible region of the spectrum.

---

This invention relates to incandescent light sources and more particularly to a gas-discharge, refractory-oxide, incandescent lamp.

The lamp industry is continually striving to increase the luminous output and efficiency of light sources. These efforts have resulted in the introduction, over the years, of the arc lamp, the incandescent lamp, the fluorescent lamp, the high pressure mercury vapor lamp and the highly efficient short arc lamp. Each of these types of lamps has its advantages and disadvantages insofar as luminous intensity, color rendition, power requirements and efficiency are concerned. Conventional incandescent lamps provide radiant energy by passing a current directly through a filamentary element and thus causing it to glow as a result of the resistive heating thereof. On the other hand, the fluorescent lamp and the high pressure vapor lamp provide radiation through the ionization of an atmosphere disposed between a pair of spaced electrodes.

The lamp of the present invention provides a highly efficient source of radiant energy by combining the radiating qualities of an element as in the incandescent lamp with the high temperature arc features of the ionized-gas, short arc type lamp.

It is accordingly an object of the present invention to provide a highly efficient, high temperature, incandescent lamp.

Another object of the present invention is to provide an incandescent light source operable with either AC or DC power.

Yet another object of the present invention is to provide a relatively sturdy incandescent lamp which can withstand temperature and shock of increased magnitude.

The foregoing objects are accomplished by providing a light source consisting of a radiation transmitting sealed envelope enclosing a gas at less than atmospheric pressure and having disposed therein a pair of spaced electrodes each surrounded by a ceramic radiator composed of a refractory oxide. The refractory oxide is caused to radiate through the heat transmitted thereto by the glowing high temperature electrode and the high temperature arc therebetween.

Other objects, as well as many of the attendant advantages of this invention, will become readily apparent as the same becomes better understood as the following detailed description is considered in connection with the accompanying drawings in which like reference characters have been employed to designate like parts throughout the several views and wherein:

FIGURE 1 is a schematic view of a refractory oxide incandescent lamp of the present invention.

FIG. 2 is a schematic view of an alternative embodiment for the refractory oxide radiator of the present invention.

Referring now to FIG. 1, there is shown a radiation-transmitting sealed glass envelope 10 having diametrically opposed terminal portions of increased thickness 12. Sealed through each of the terminal portions 12 are lead-in conductors 14 and 16 carrying, respectively, at their innermost ends opposed tungsten electrodes 18 and 20. The tungsten electrodes are of the heavy straight or rippled type. Although coaxially mounted tungsten filament heaters of the coiled type are feasible they are technically not practical, as they do not maintain their shape and position during operation at extremely high temperatures.

A coiled tungsten filament 22 is disposed between lead-in conductors 16 and tungsten electrode 20 and connected to each of those elements in electrical series to limit the current of the lamp in the conventional manner while also providing additional light which mixes with that of the cylindrical oxide radiators. In addition to lead-in conductors 14, 16 support wires 24 and 28 are also sealed through terminal portions 12 of the glass envelope. Support wire 24 supports at its inner end the cylindrical ceramic radiator 30 which surrounds tungsten electrode 18. Similarly, support wire 28 has mounted at its inner end cylindrical ceramic radiator 32 surrounding tungsten electrode 20. An additional support wire 34 is necessary to support tungsten electrode 20 because of the interpositioning of the filament 22 between the electrode and lead-in conductor 16.

An alternative embodiment is shown in FIG. 2 and is substantially identical with the FIG. 1 embodiment with the exception that cylindrical ceramic radiators 30 and 32 have been replaced by a single cylindrical ceramic radiator 31 supported at each end by support wires 24 and 28. Although the ceramic radiators 30, 32 and 31 have been shown and described as cylindrical, it should be understood that other shapes are possible. It should, however, also be pointed out that maximum radiation from the ceramic radiators is dependent on temperature and area and hence proximity to the arc of a maximum area of the radiator is important, as will later be described.

The lamp may be operated on either AC or DC power and a suitable lamp starter is interposed in the actuating circuit 36 which may be a conventional RF starter capable of breaking down the arc gap between the electrodes to initiate the arc.

Refractory oxides, being better emitters of light at comparatively low temperatures (1700 to 2100° C.) than refractory metals, refractory oxides are employed in the lamp of the present invention. However, since all refractory oxides are insulators at room temperatures and only some, for example, zirconium oxide, conduct electricity even at elevated temperatures, the oxides must be indirectly heated or preheated in order to become thermal radiators of light as opposed to the direct current heating available with refractory metals. The refractory oxide, cylindrical radiators 30, 32 and 31 (FIG. 2) may consist principally of any one of zirconium oxide, magnesium oxide, or thorium oxide. Zirconium oxide is, however, preferred for highest efficiency. The atmosphere within the envelope 10 is preferably any ionizable gas which will not chemically react with the lamp components to cause a breakdown through blackening of the bulb. As a specific embodiment, argon in a vapor pressure range of from 50 to 110 torr and an electrode spacing of one centimeter is employed to provide optimum operation of the lamp. Additions of small amounts of xenon, for example, 10% by volume, can be added to aid in starting the lamp. Argon is preferred since it has a high ionization potential and results in high electrode temperatures. Atmospheres consisting of helium, xenon and neon alone or in combination will operate with substantially equal success but, of course, in each instance, optimum operation is a function of the gas vapor pressure and electrode spacing.

Geometrically, the coaxial cylindrical arrangement of an internal heater and outside radiator constitutes a most effecting heat transfer system. A similar arrangement is sometimes employed to directly heat oxide cathodes in many types of vacuum tubes. In order to heat the refractory oxide radiators to temperatures at which they emit selectively in the visible region of the spectrum, the heating element must not only be at a high temperature, but the emitting area of the heater must also be substantially coextensive with the radiator, as shown in the drawings, for optimum results.

The opposed electrodes 18 and 20 employ the phenomenon of "partition of power" in an electrode stabilized inert gas discharge. The principle of "partition of power" is discussed in detail in an article by Heniz G. Sell et al. titled "The Partition of Power in High-Current Low-Pressure Metal Vapor Arcs. A Theoretical Interpretation Based on Arc Melting Experiments on Tungsten" in Transactions of the Vacuum Metallurgy Conference, 1960. Briefly, this phenomenon involves electron and positive ion flow in the ionized plasma forming the arc. The impingement of free electrons and positive ions on the oppositely charged electrodes causes heating of the electrode to relatively high temperatures, and it has been found that in an argon atmsophere with a vapor presure in a range of from 50 to 110 torr, optimum energy is liberated at each electrode. The energy liberated from these electrodes is from 90 to 95 percent in the form of infrared radiation which heats the surrounding refractory oxide cylinder well into its radiation temperature levels.

In operation the lamp is started with a conventional ignition device 38 on either AC or DC power. The inert gas fill pressure is lower at room temperature but increases to an optimum power partition pressure as the lamp warms up. The lamp current is limited by the filament 22 in series with tungsten electrode 20 and the light from the filament mixes with that of the cylindrical oxide radiators which are heated by radiation from the tungsten electrodes to produce selective radiation and good light rendition.

As can be seen from the foregoing, the lamp of the present invention provides a novel light source employing heated refractory oxide cylindrical radiators as its principal source of radiant energy. The lamp is simple in construction, sturdy, and provides high intensity incandescent light by means other than the conventional filament resistance principle.

It should be clearly understood, of course, that the foregoing disclosure relates to only preferred embodiments of the invention and that numerous modifications or alterations may be made therein without departing from the spirit and scope thereof.

What is claimed is:

1. A light source in combination with a source of electrical power, said light source comprising:
   (a) a radiation transmitting sealed envelope containing an inert, ionizable gas at less than atmospheric pressure,
   (b) first and second tungsten electrodes mounted within said envelope to define an arc gap,
   (c) first and second refractory oxide cylinders mounted within said envelope and respectively surrounding and spaced from said first and second tungsten electrodes, and
   (d) a ballistic filament within said envelope connected in series with one of said electrodes whereby upon energization of said electrodes, said cylinders are heated and caused to radiate.

2. A light source according to claim 1 wherein said refractory oxide cylinders are composed of at least one material of the group comprising zirconium oxide, magnesium oxide or thorium oxide.

3. A light source according to claim 1 wherein said inert gas at less than atmospheric pressure comprises at least one gas of the group consisting of helium, argon, xenon and neon.

4. A light source according to claim 3 wherein the vapor pressure of said inert gas within said envelope is between 50 and 110 torr during operation of said light source.

References Cited

UNITED STATES PATENTS

| | | | |
|---|---|---|---|
| 1,116,480 | 11/1914 | Podszus | 313—8 |
| 2,298,581 | 10/1942 | Abadie | 313—8 X |
| 2,367,595 | 1/1945 | Marden | 313—8 |
| 1,023,485 | 4/1912 | Trowless | 313—14 X |
| 2,022,219 | 11/1935 | Ruben | 313—9 X |
| 2,449,113 | 9/1948 | Fruth | 313—217 X |
| 3,067,353 | 12/1962 | Frouws | 313—198 X |

JAMES W. LAWRENCE, Primary Examiner.

R. F. HOSSFELD, Assistant Examiner.

U.S. Cl. X.R.

313—185, 214, 217